Oct. 19, 1926.

A. DEWANDRE 1,603,750

POWER BRAKE

Filed March 13, 1924

Inventor
Albert Dewandre
by Emil Bonnelycke
Attorney

Patented Oct. 19, 1926.

1,603,750

UNITED STATES PATENT OFFICE.

ALBERT DEWANDRE, OF LIEGE, BELGIUM, ASSIGNOR TO SOCIETE ANONYME SERVO FREIN DEWANDRE, OF LIEGE, BELGIUM.

POWER BRAKE.

REISSUED

Application filed March 13, 1924, Serial No. 699,022, and in Belgium February 12, 1924.

This invention relates to power brakes, in which the braking force is produced by the action of the partial vacuum created by the suction of the engine and transmitted to a cylinder in which works a piston connected to the brakes.

The control of these known brakes is effected by means of a distributor which places the brake cylinder in communication alternately with the engine suction and the atmosphere; the action of the distributor being governed by a control lever which may be either the brake pedal or a hand lever, but which in any case requires, in each position, for being further moved, an effort which is independent of the braking action.

My invention has for its object the provision of means such that the effort for actuating the distributor increases with the braking effort on the wheels, the operator thereby being enabled to obtain an exact indication of the braking action.

According to the invention, the piston of the motor brake is connected to the brakes by suitable members which are also connected to the control lever so that when the brakes are in action, these members exert on the said lever a reaction which is a fraction of the pressure of the brakes and which must be supported by the operator.

Figure 1:
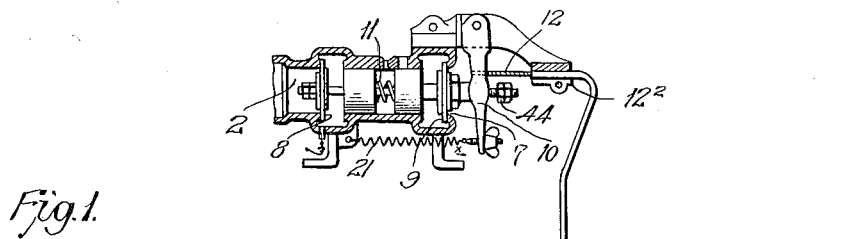
Figure 2:
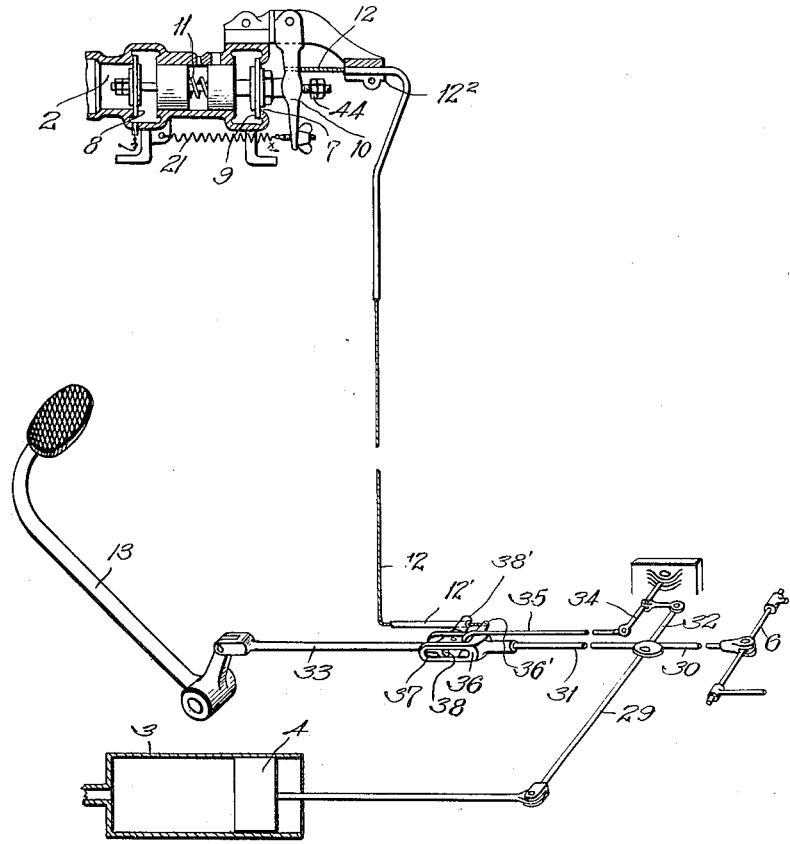
Figure 2:
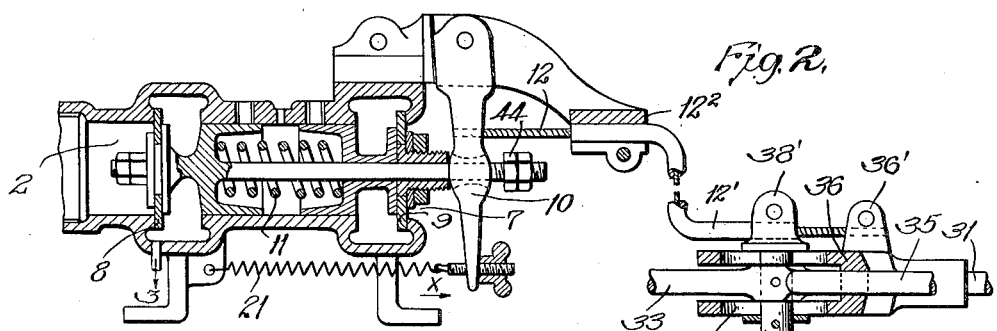

In the accompanying drawing, Figure 1 is a perspective view of one embodiment of the invention; and Fig. 2 is a detail view, on an enlarged scale and mainly in section, of a lost-motion device comprised in the connection between the control lever and the brake rodding, and of the distributor with which such device is operatively associated.

Referring more particularly to the drawing, 3 indicates the cylinder of the brake motor, 4 the piston disposed therein, and 13 the control lever (here shown as the brake pedal). The displacement of piston 4 is obtained by the partial vacuum created by the suction of the engine, in a manner similar to that disclosed in my Patent No. 1,539,166, granted May 26, 1925; such vacuum being transmitted to said cylinder by the distributor, as hereafter explained.

Referring to Fig. 2, which shows the distributor in detail, it will be observed that this device comprises two valves 8 and 9 which respectively control communication of the break cylinder 3 with the engine suction through duct 2, and with the atmosphere through opening 7; both valves being normally pressed against their seats by an interposed spring 11. The air valve 9 is mounted to slide on the stem of the suction valve 8 and is opened by being pushed to the left by a lever 10; while the suction valve 8 is opened by being pulled to the right by said lever 10 engaging an abutment 44 on the stem of the valve. The operation of this lever 10 is effected by a Bowden shaft which acts in the same way as the shaft in the patented construction and the wire 12 of which is fastened to said lever at one end; the adjacent end of the sheath 12' of the shaft being secured in a fixed sleeve $12^2$ or other stationary part.

The piston 4 is connected to one end of a lever 29 which, toward its other end 32, has pivotally connected to it the inner ends of two rods 30 and 31 that extend in opposite directions and are themselves connected, respectively, to the brake rodding 6 and to a rod 33 actuated by and pivoted to the control lever or pedal 13. The end 32 of the lever 29 is connected to an intermediate point on a balancing lever 34 which is pivoted at one end to a fixed point on the frame and is attached at its other end to one end of a rod 35 whose opposite end is rigidly joined to rod 33. The outer end of the rod 31 is provided with a fork 36 (see Fig. 2), and the two arms of this fork have elongated slots 37 in which may slide the ends of a cross-pin 38 secured at the junction of rods 33 and 35. The other end of the sheath 12' of the Bowden shaft is attached to the head 38' of pin 38, and the corresponding end of the wire 12 thereof is fastened to a lug or bracket 36' on fork 36.

Due to the above-described arrangement, it will be apparent that depression of the pedal will first of all impart an endwise forward movement to rod 33 relative to rod 31, owing to the travel of the pin 38 toward the front end of the slots 37 in fork 36; the rods 31 and 33 thus forming the two movably-related parts of a lost-motion connection. Now the pin 38 has attached to it one end of the sheath 12' of the Bowden shaft, the other end of which is secured to the fixed point $12^2$ on the distributor, so that as a result of the increased distance between the pin-carried end of the sheath and the adjacent end of the wire 12 a force is exerted upon the wire which causes it to move lever 10 counter-clockwise in the direction of arrow X (Fig. 2), whereby said lever engages the abutment 44 on the stem of the suction valve 8 and opens that valve. This connects the brake cylinder 3 with the engine suction, with the result that piston 4 is drawn forward and pulls lever 29 in the same direction; said lever rocking about its end 32 as a fulcrum and moving with it the rod 30 which thus exerts a braking effort on the rodding 6. Rod 31 also moves in the same direction as rod 30 and, hence, decreases the distance between the fork-carried end of the wire 12 and the pin-carried end of the sheath 12' of the Bowden shaft, so that the wire then slacks and the spring 21 connected to the distributor lever 10 moves back the latter to a neutral position position while at the same time the suction valve is closed by spring 11, the air valve 9 still remaining closed. Further depression of the pedal will have the effect of again increasing the distance between the aforesaid ends of the two parts of the Bowden shaft, so that lever 10 will open the suction valve and a fresh braking effort will be applied to the brakes.

But as explained above, the initial swinging or pivotal movement of lever 29 produced consequent upon the introduction of the partial vacuum into cylinder 3 takes place about its end 32 as a fulcrum or pivot, such movement being transmitted through rod 30 to the brake rodding 6 to apply the brakes. On the continued forward movement of the piston, however, the lever is caused to rock about its point of connection with the rods 30 and 31 as a fulcrum or pivot, because such point has become virtually a fixed point due to the application of the brakes. That being so, the clockwise rocking movement of lever 29 about its new fulcrum point will entail a swinging movement of lever 34 to the right in the direction of the arrow in Fig. 1 and, consequently, the rod 35 will likewise be pulled to the right as it is pivoted to lever 34. This movement of rod 35 will be transmitted directly to rod 33, and the latter, in turn, will exert on the pedal 13 an effort which increases in direct proportion with the effort exerted on the brakes and which is directed in the opposite direction to that exerted thereon by the operator. But that effort is only a fraction of the effort exerted on the brakes, so that the operator is thus enabled to obtain an accurate indication of the extent or degree of the braking action. The value of the braking action is dependent not on the position of the brake lever or pedal, but on the pressure exerted by the foot of the operator on said pedal.

When the pressure on the pedal is relieved, the pedal comes back, carrying rod 33 to the right, and brings pin 38 with it. This movement of said rod decreases the distance between the end of the wire 12 carried by fork 36 and the end of sheath 12' carried by pin 38; and as a result of such decrease, the distributor lever 10 is swung to the left or clockwise (Fig. 2) so as to open the air valve 9. The cylinder 3 is thereby connected with atmosphere, and piston 4 is forced to the right by the usual return spring (not shown); its movement being transmitted to lever 29 and thence to the rodding 6 so as to release the brakes. At the same time, rod 31 is carried to the right and brings back pin 38 in slots 37, and in consequence lever 10 is returned to neutral position by spring 21, and valve 9 is re-closed by spring 11.

What I claim is—

1. In a brake system for motor vehicles, the combination, with rodding for the brakes, of a brake cylinder; a piston in said cylinder subjected to pressure differences; a brake lever; and a connection between the piston and the brake rodding for transmitting the movement of the former to the latter, said connection being operatively related to said lever so as to exert thereon a reaction which is a fraction of the pressure of the brakes.

2. In a brake system for motor vehicles, the combination, with rodding for the brakes, of a brake cylinder; a piston in said cylinder subjected to pressure differences; a brake lever having a lost-motion connection with the rodding; and a mechanical connection between the piston and the brake rodding for transmitting the movement of the former to the latter, said connection being operatively related to said lever so as to exert thereon a reaction which is a fraction of the pressure of the brakes.

3. In a brake system for motor vehicles, the combination, with rodding for the brakes, of a brake cylinder; a piston in said cylinder subjected to pressure differences; a control lever having a positive connection with the brake rodding; a lever connected to the first lever and a mechanical connection between the piston, the rodding and the second-named lever to transmit the movement of the piston to the rodding and to exert simultaneously on the first lever, through the intermediary of the second-named lever, a reaction which is a fraction of the pressure of the brakes.

4. In a brake system for motor vehicles, the combination, with rodding for the brakes, of a brake cylinder; a piston in said cylinder subjected to pressure differences; a brake lever; and a lever system connecting the piston and the brake rodding for transmitting the movement of the former to the latter, said lever system being operatively related to the brake lever so as to exert thereon a reaction which is a fraction of the pressure of the brakes.

5. A brake system, according to claim 4, in which the lever system embodies a lever which is connected at one end to the piston and at two other points to the brake rodding and brake lever, respectively.

6. A brake system, according to claim 4, in which the lever system embodies a lever which is connected at one end to the piston, and an intermediate lever which is attached to the brake lever; the first-named lever being additionally connected at one point to the intermediate lever and at a second point to the brake rodding.

7. In a power brake system for automobiles, a manual control element, a power-actuated element, a mechanical connection between said two elements, and a brake-applying medium attached to said connection at a point intermediate said two elements, whereby the braking effort of the power-actuated element is divided in a definite proportion between the brake-applying medium and the manual control element.

8. In a power brake system for automobiles, a manual control element, a power-actuated element, a floating lever connected to both of said elements, and a brake-applying medium connected to said lever at a point intermediate its connection with said elements, whereby the braking effort of the power-actuated element is divided in a definite proportion between the brake-applying medium and the manual control element.

In testimony whereof I affix my signature.

ALBERT DEWANDRE.